United States Patent [19]

Sekiba et al.

[11] Patent Number: 5,248,650
[45] Date of Patent: Sep. 28, 1993

[54] CATALYSTS FOR THE PURIFICATION OF EXHAUST GAS

[75] Inventors: Toru Sekiba; Akihide Okada, both of Yokohama; Fumihiro Uchikawa, Miura, all of Japan

[73] Assignee: Nissan Motor Co., Ltd., Yokohama, Japan

[21] Appl. No.: 994,689

[22] Filed: Dec. 22, 1992

[30] Foreign Application Priority Data

Jan. 10, 1992 [JP] Japan ................................. 4-2888

[51] Int. Cl.$^5$ .................... B01J 21/04; B01J 23/10; B01J 23/44; B01J 23/46
[52] U.S. Cl. ................. 502/303; 502/304; 423/213.5
[58] Field of Search ................. 502/303, 304; 423/213.5

[56] References Cited

U.S. PATENT DOCUMENTS

| | | | |
|---|---|---|---|
| 4,782,038 | 11/1988 | Gandhi et al. | 502/304 |
| 5,057,483 | 10/1991 | Wan | 502/304 |
| 5,063,192 | 11/1991 | Murakami et al. | 502/304 X |
| 5,147,842 | 9/1992 | Funabiki et al. | 502/304 |

*Primary Examiner*—W. J. Shine
*Attorney, Agent, or Firm*—Foley & Lardner

[57] ABSTRACT

A catalyst for the purification of exhaust gas comprises a combination of palladium carried on cerium oxide and palladium carried on alumina, or further rhodium carried on alumina, in which a weight ratio of palladium carried on cerium oxide to palladium carried on alumina is 2:8–8:2. Preferably, the cerium oxide contains at least one of zirconium, lanthanum, neodymium and praseodymium, or the alumina contains at least one of zirconium, lanthanum, neodymium, cerium, strontium and barium. This catalyst develops excellent purification performances against exhaust gas of oxidizing atmosphere to reducing atmosphere.

4 Claims, No Drawings

CATALYSTS FOR THE PURIFICATION OF EXHAUST GAS

BACKGROUND OF THE INVENTION

1. Field of the Invention

This invention relates to a catalyst for purifying hydrocarbon (HC), carbon monoxide (CO) and nitrogen oxide (NOx) in an exhaust gas discharged from an internal combustion engine for automobiles or the like.

2. Description of the Related Art

As the conventional catalyst for the purification of exhaust gas, there is used a structure that a catalytic metal such as platinum (Pt), palladium (Pd), rhodium (Rh) or the like is carried on alumina, cerium oxide or the like and the coated onto a monolith carrier. Particularly, Pd is cheap and excellent in the catalytic activity at a low temperature, so that it is attempted to prepare various catalysts for the purification of exhaust gas using Pd as a catalyst active site.

In the conventional exhaust gas purification catalysts provided with Pd carried layer, however, exhaust gases widely varying from reducing composition to oxidizing composition are directly introduced into the catalyst to purify harmful components, so that if Pd is carried on a certain kind of a substance, the purification ratio is relatively high in a particular exhaust gas atmosphere, but it is a fear that the purification ratio can not be maintained at a high level in exhaust gas atmospheres other than the above particular atmosphere.

SUMMARY OF THE INVENTION

The invention is noticed in the aforementioned conventional problems and based on a knowledge that even if the exhaust gas composition varies over a wide range, the purification ratio can be maintained at a higher level by combining Pd carried layers having different properties. That is, the exhaust gas purification catalyst according to the invention is based on a combination of Pd carried on cerium oxide and Pd carried on alumina. The Pd carried on cerium oxide is high in the purification ratio against exhaust gas ranging from oxidizing atmosphere to stoichiometric atmosphere, while the Pd carried on alumina is high in the purification ratio against exhaust gas of reducing atmosphere. These performances are strongly developed by adding at least one of zirconium, lanthanum, neodymium and praseodymium to cerium oxide, or by adding at least one of zirconium, lanthanum, neodymium, cerium, strontium and barium to alumina. Therefore, the combination of Pd carried on cerium oxide and Pd carried on alumina can provide a high-performance catalyst maintaining a high purification ratio even if the composition of the exhaust gas varied. Moreover, it is desirable that the weight ratio of Pd carried on cerium oxide to Pd carried on alumina is 2.8-8:2.

The exhaust gas purification catalyst according to the invention comprises a coating layer of palladium carried on cerium oxide and palladium carried on alumina, or further a coating layer of rhodium carried on alumina and formed on the above coating layer, in which the weight ratio of palladium carried on cerium oxide to palladium carried on alumina is 2:8-8:2. In a preferred embodiment of the invention, at least one of zirconium, lanthanum, neodymium and praseodymium is added to cerium oxide, or at least one of zirconium, lanthanum, neodymium, cerium, strontium and barium is added to alumina.

DESCRIPTION OF THE PREFERRED EMBODIMENTS

The production of the catalyst according to the invention will be described below.

At first, an aqueous solution of Pd salt is impregnated into powder of cerium oxide, dried and fired in air, for example, at 400° C. for 1 hour to obtain a powder (a) containing 0.1-3.0% by weight of palladium to cerium oxide. In this case, a water-soluble salt such as palladium chloride, palladium nitrate, palladium dinitroammine, palladium acetate, tetraammine palladium dichloride or the like may be used as a palladium salt.

Similarly, the aqueous solution of Pd salt is impregnated into activated alumina, dried and fired in air, for example, at 400° C. for 1 hour to obtain a powder (b) containing 0.1-3.0% by weight of palladium to activated alumina.

Moreover, it is desirable that at least one of zirconium, lanthanum, neodymium and praseodymium is added to cerium oxide, or at least one of zirconium, lanthanum, neodymium, cerium, strontium and barium is added to activated alumina. In this case, the amount in total of these elements added as a metal to cerium oxide or activated alumina is preferably within a range of 3-30% by weight per the weight of the catalyst. If the amount is outside the above range, the purification performance as the catalyst is undesirably degraded.

Then, the powders (a) and (b) are mixed so as to have a weight ratio of Pd of 2:8-8:2. The resulting mixed powder is added with alumina sol and pulverized into a slurry, which is adhered to a catalyst carrier such as monolith carrier substrate and then fired at a temperature of, for example, 400°-650° C. to obtain a catalyst for the purification of exhaust gas.

If necessary, alumina powder carried with Rh may be mixed with Pd powder, or a slurry containing Rh may be prepared and adhered to the carrier substrate in addition to the Pd slurry.

When Pd is carried on cerium oxide, the purification ratio against the exhaust gas of approximately stoichiometric atmosphere becomes high. This is due to the fact that cerium oxide can continuously change between trivalent and tetravalent oxidation states in accordance with variation of atmosphere and temperature to provide an ability of discharging or absorbing oxygen (i.e. $O_2$ storing ability), and consequently the rates of absorbing and discharging oxygen at Pd as an inlet and outlet becomes higher and also the reaction rate with HC, CO, NOx becomes higher. Since Pd is maintained at a hardly coarsening and high oxidized state owing to the carried state on cerium oxide, the degradation of performance due to the reduction and coarsening can be suppressed. Furthermore, it is desirable that when at least one of zirconium, lanthanum, neodymium and praseodymium is added to cerium oxide, the growth of cerium oxide crystal at a high temperature is suppressed to maintain a high $O_2$ storing ability. However, Pd carried on cerium oxide is low in the purification performance against exhaust gas of reducing atmosphere because it is considered that Pd is lacking in electron due to a high oxidized state and hence the adsorption due to the supply of electron from hydrocarbon is strongly caused to lower the purification performance through poisoning of hydrocarbon in exhaust gas of reducing atmosphere having a high hydrocarbon concentration. Such a lowering of the purification performance is supplemented by Pd carried on alumina. That is, Pd carried on alumina is low in the purification performance in the exhaust gas of stoichiometric atmosphere as compared with Pd carried on cerium oxide, but becomes higher in the reducing atmosphere. Particularly, the purification performance in the reducing atmosphere is considerably improved by adding at least one of zirconium, lanthanum, neodymium, cerium, strontium and barium to alumina. By combining Pd carried on cerium oxide and Pd carried on alumina at a proper ratio can be provided high-performance catalysts maintaining a high purification ratio in accordance with a wide change of exhaust gas atmosphere. In this connection, the weight ratio of Pd carried on cerium oxide to Pd carried on alumina is within a range of 2:8–8:2, preferably 3:7–6:4.

The following examples are given in illustration of the invention and are not intended as limitations thereof.

EXAMPLE 1

An aqueous solution of palladium nitrate is impregnated into powder of cerium oxide, which is dried and fired at 400° C. for 2 hours to obtain Pd-carried cerium oxide powder (a), in which the concentration of Pd carried is 0.75% by weight. Separately, an aqueous solution of cerium nitrate is impregnated into powder of activated alumina, which is dried and fired at 600° C. for 1 hour, in which the concentration of cerium carried is 7% by weight. The thus obtained powder is impregnated with an aqueous solution of palladium nitrate, dried and fired at 400° C. for 2 hours to obtain Pd-carried activated alumina powder (b), in which the concentration of Pd carried is 2.00% by weight. 400 g of the powder (a), 600 g of the powder (b) and 100 g of alumina sol are mixed and pulverized in a ball mill to obtain a slurry, which is adhered to a monolith carrier (0.7L, 300 cells) in an amount of 200 g/L and fired at 400° C. for 1 hour to obtain a catalyst A. In the catalyst A, the amount of Pd is 2.0 g/carrier.

EXAMPLE 2

A catalyst B is obtained by the same method as in Example 1 except that the concentration of Pd carried on cerium oxide is 1.50% by weight and the concentration of Pd carried on activated alumina is 1.50% by weight.

EXAMPLE 3

A catalyst C is obtained by the same method as in Example 1 except that the concentration of Pd carried on cerium oxide is 2.25% by weight and the concentration of Pd carried on activated alumina is 1.00% by weight.

EXAMPLE 4

A catalyst D is obtained by the same method as in Example 1 except that the concentration of Pd carried on cerium oxide is 3.00% by weight and the concentration of Pd carried on activated alumina is 0.50% by weight.

EXAMPLE 5

A catalyst E is obtained by the same method as in Example 2 except that zirconium-cerium composite oxide containing 10% by weight of zirconium is used instead of cerium oxide.

EXAMPLE 6

A catalyst F is obtained by the same method as in Example 2 except that neodymium-cerium composite oxide containing 10% by weight of neodymium is used instead of cerium oxide.

EXAMPLE 7

A catalyst G is obtained by the same method as in Example 5 except that the activated alumina is impregnated with 7% by weight as cerium of cerium nitrate and 5% by weight as lanthanum of lanthanum nitrate and fired at 600° C. for 1 hour.

EXAMPLE 8

A catalyst H is obtained by the same method as in Example 5 except that the activated alumina is impregnated with 7% by weight as cerium of cerium nitrate and 5% by weight as barium of barium acetate and fired at 600° C. for 1 hour.

EXAMPLE 9

A catalyst I is obtained by the same method as in Example 5 except that the activated alumina is impregnated with 7% by weight as cerium of cerium nitrate and 5% by weight as neodymium of neodymium nitrate and fired at 600° C. for 1 hour.

EXAMPLE 10

A catalyst J is obtained by the same method as in Example 5 except that the activated alumina is impregnated with 7% by weight as cerium of cerium nitrate, 5% by weight as zirconia of acetic zircosol and 5% by weight as barium of barium acetate and fired at 600° C. for 1 hour.

EXAMPLE 11

An aqueous solution of rhodium nitrate is impregnated into activated alumina powder, which is dried and fired at 400° C. for 2 hours to obtain Rh-carried activated alumina powder (c), in which the concentration of Rh carried is 2.00% by weight. Then, 150 g of the powder (c), 850 g of activated alumina and 1000 g of alumina sol are mixed and pulverized in a ball mill to obtain a slurry (d). The slurry (d) is adhered to the catalyst E of Example 5 in an amount of 30 g/L and fired at 400° C. for 1 hour to obtain a catalyst K. In the catalyst K, the amount of Pd is 2.0 g/carrier and the amount of Rh is 0.06 g/carrier.

EXAMPLE 12

The slurry (d) obtained in Example 11 is adhered to the catalyst J of Example 10 in an amount of 30 g/L and fired at 400° C. for 1 hour to obtain a catalyst L. In the catalyst L, the amount of Pd is 2.0 g/carrier and the amount of Rh is 0.06 g/carrier.

COMPARATIVE EXAMPLE 1

A catalyst M is obtained by the same method as in Example 1 except that the concentration of Pd carried on activated alumina is 2.50% by weight without carrying Pd on cerium oxide.

COMPARATIVE EXAMPLE 2

A catalyst N is obtained by the same method as in Example 1 except that the concentration of Pd carried on cerium oxide is 3.75% by weight without carrying Pd on activated alumina.

COMPARATIVE EXAMPLE 3

The slurry (d) obtained in Example 11 is adhered to the catalyst M of Comparative Example 1 in an amount of 30 g/L and fired at 400° C. for 1 hour to obtain a catalyst O. In the catalyst O, the amount of Pd is 2.0 g/carrier and the amount of Rh is 0.06 g/carrier.

COMPARATIVE EXAMPLE 4

The slurry (d) obtained in Example 11 is adhered to the catalyst N of Comparative Example 2 in an amount of 30 g/L and fired at 400° C. for 1 hour to obtain a catalyst P. In the catalyst P, the amount of Pd is 2.0 g/carrier and the amount of Rh is 0.06 g/carrier.

EXAMPLE 13

A catalyst Q is obtained by the same method as in Example 2 except that lanthanum-cerium composite oxide containing 10% by weight of lanthanum is used instead of cerium oxide.

EXAMPLE 14

A catalyst R is obtained by the same method as in Example 2 except that praseodymium-cerium composite oxide containing 10% by weight of praseodymium is used instead of cerium oxide.

EXAMPLE 15

A catalyst S is obtained by the same method as in Example 2 except that zirconium-lanthanum-cerium composite oxide containing 10% by weight of zirconium and 10% by weight of lanthanum is used instead of cerium oxide.

EXAMPLE 16

A catalyst T is obtained by the same method as in Example 2 except that zirconium-praseodymium-cerium composite oxide containing 10% by weight of zirconium and 10% by weight of praseodymium is used instead of cerium oxide.

EXAMPLE 17

A catalyst U is obtained by the same method as in Example 2 except that zirconium-neodymium-cerium composite oxide containing 10% by weight of zirconium and 10% by weight of neodymium is used instead of cerium oxide.

EXAMPLE 18

A catalyst V is obtained by the same method as in Example 5 except that the activated alumina is impregnated with 7% by weight as cerium of cerium nitrate and 5% by weight as zirconia of acetic zircosol and fired at 600° C. for 1 hour.

EXAMPLE 19

A catalyst W is obtained by the same method as in Example 5 except that the activated alumina is impregnated with 7% by weight as cerium of cerium nitrate and 5% by weight as strontium of strontium acetate and fired at 600° C. for 1 hour.

EXAMPLE 20

A catalyst X is obtained by the same method as in Example 5 except that the activated alumina is impregnated with 7% by weight as cerium of cerium nitrate, 5% by weight as zirconia of acetic zircosol and 5% by weight as lanthanum of lanthanum nitrate and fired at 600° C. for 1 hour.

TEST EXAMPLE

The catalytic activity after durability test is evaluated with respect to the catalysts of Examples 1–20 and Comparative Examples 1–4 under the following conditions.

| Catalyst | Monolith type noble metal catalyst |
|---|---|
| Engine displacement | 2200 cc |
| Gas temperature at an inlet of catalyst | 750° C. |
| Space velocity | about 94,000 $H^{-1}$ |
| Durable time | 100 hours |
| Composition of exhaust gas at inlet | CO 0.5 ± 0.1% <br> $O_2$ 0.5 ± 0.1% <br> HC 1100 ppm <br> NO 1300 ppm <br> $CO_2$ 15% |
| Evaluation conditions <br> 10 mode evaluation through vehicle Displacement | 1500 cc |

The evaluation results are shown in Table 1. As seen from Table 1, the catalytic activity in all examples is considerably high as compared with those of the comparative examples.

TABLE 1

| Catalyst | Purification ratio (%) in 10 mode emission | | |
|---|---|---|---|
| | HC | CO | NOx |
| A (Example 1) | 88 | 62 | 72 |
| B (Example 2) | 90 | 66 | 77 |
| C (Example 3) | 91 | 68 | 80 |
| D (Example 4) | 92 | 66 | 70 |
| E (Example 5) | 93 | 71 | 80 |
| F (Example 6) | 94 | 70 | 79 |
| G (Example 7) | 95 | 75 | 85 |
| H (Example 8) | 95 | 78 | 92 |
| I (Example 9) | 95 | 74 | 82 |
| J (Example 10) | 96 | 80 | 93 |
| K (Example 11) | 95 | 79 | 90 |
| L (Example 12) | 96 | 82 | 95 |
| M (Comparative Example 1) | 85 | 57 | 60 |
| N (Comparative Example 2) | 90 | 61 | 65 |
| O (Comparative Example 3) | 90 | 70 | 79 |
| P (Comparative Example 4) | 90 | 77 | 85 |
| Q (Example 13) | 91 | 68 | 77 |
| R (Example 14) | 92 | 69 | 79 |
| S (Example 15) | 93 | 72 | 82 |
| T (Example 16) | 93 | 73 | 83 |
| U (Example 17) | 93 | 75 | 84 |
| V (Example 18) | 93 | 73 | 82 |
| W (Example 19) | 95 | 76 | 88 |
| X (Example 20) | 94 | 77 | 88 |

As mentioned above, the catalyst for the purification of exhaust gas according to the invention comprises an adequate combination of Pd carried on cerium oxide, which is excellent in the purification of exhaust gas of approximately stoichiometric atmosphere, and Pd carried on alumina, which is excellent in the purification of exhaust gas of reducing atmosphere, and preferably contains at least one of zirconium, lanthanum, neodymium and praseodymium added to cerium oxide, or at least one of zirconium, lanthanum, neodymium, cerium, strontium and barium added to alumina. Such a catalyst exhibits a higher catalytic activity against exhaust gas from engine largely varying its composition as compared with the conventional exhaust gas purification catalysts, so that it is effective to improve the performances of the catalyst and reduce the cost of the catalyst.

What is claimed is:

1. A catalyst for the purification of exhaust gas comprising a coating layer of palladium carried on cerium oxide and palladium carried on alumina, or further a coating layer of rhodium carried on alumina and formed on the above coating layer, in which a weight ratio of palladium carried on cerium oxide to palladium carried on alumina is 2:8–8:2.

2. A catalyst according to claim 1, wherein said cerium oxide is added with at least one of zirconium, lanthanum, neodymium and praseodymium.

3. A catalyst according to claim 1, wherein said alumina is added with at least one of zirconium, lanthanum, neodymium, cerium, strontium and barium.

4. A catalyst according to claim 1, wherein said weight ratio is 3:7–6:4.

* * * * *